United States Patent [19]
Danzer et al.

[11] B 3,983,556

[45] Sept. 28, 1976

[54] RADAR VIDEO CLIPPING LEVEL DERIVED FROM TARGET SIGNAL

[75] Inventors: Paul M. Danzer, Norwalk; Giles E. Rae, Ridgefield, both of Conn.

[73] Assignee: United Technologies Corporation, Hartford, Conn.

[22] Filed: Apr. 27, 1972

[21] Appl. No.: 248,240

[44] Published under the second Trial Voluntary Protest Program on January 13, 1976 as document No. B 248,240.

[52] U.S. Cl. .............................................. 343/7 A
[51] Int. Cl.[2] ........................................... G01S 7/28
[58] Field of Search ............................ 343/7 A, 7.3

[56] References Cited
UNITED STATES PATENTS

| | | |
|---|---|---|
| 3,603,994 | 9/1971 | Williams et al. ..................... 343/7.3 |
| 3,611,369 | 10/1971 | Maguire ............................. 343/7 A |
| 3,701,149 | 10/1972 | Patton et al. ...................... 343/7 A X |

*Primary Examiner*—T. H. Tubbesing
*Attorney, Agent, or Firm*—M. P. Williams

[57] ABSTRACT

In a track while scan radar which pinpoints a target location by comparing target return voltage summations in the early half of a range gate with those in the late half of the range gate, and with the target return voltage summations in the left half of a multi-pulse azimuth gate with those in the right half of the azimuth gate, noise and clutter are clipped by means of a clipping signal level which is chosen from the lower value of the summation of the early and late target return voltage summations and the summation of the right and left target return voltage summations, thereby using the noise, clutter and target return signal within the target window in one scan to derive the clipping level for a succeeding scan.

5 Claims, 10 Drawing Figures

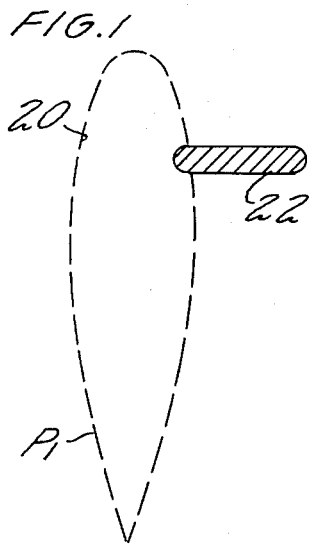
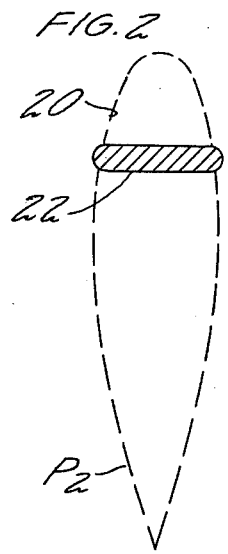
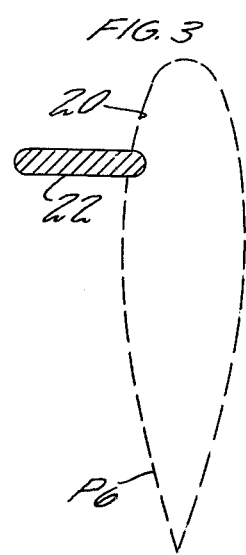
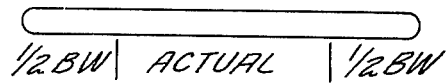
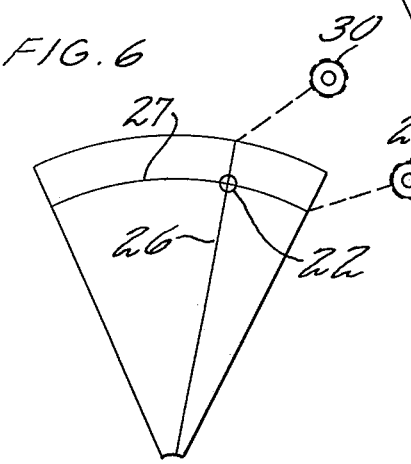
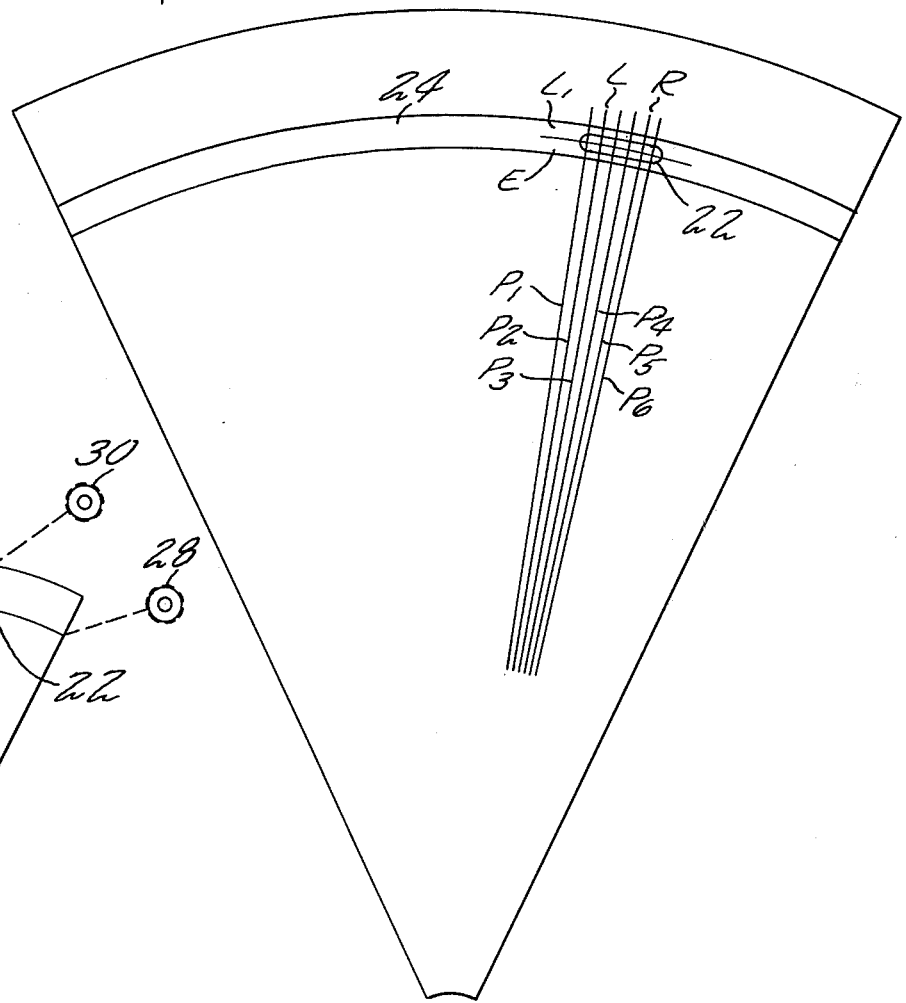

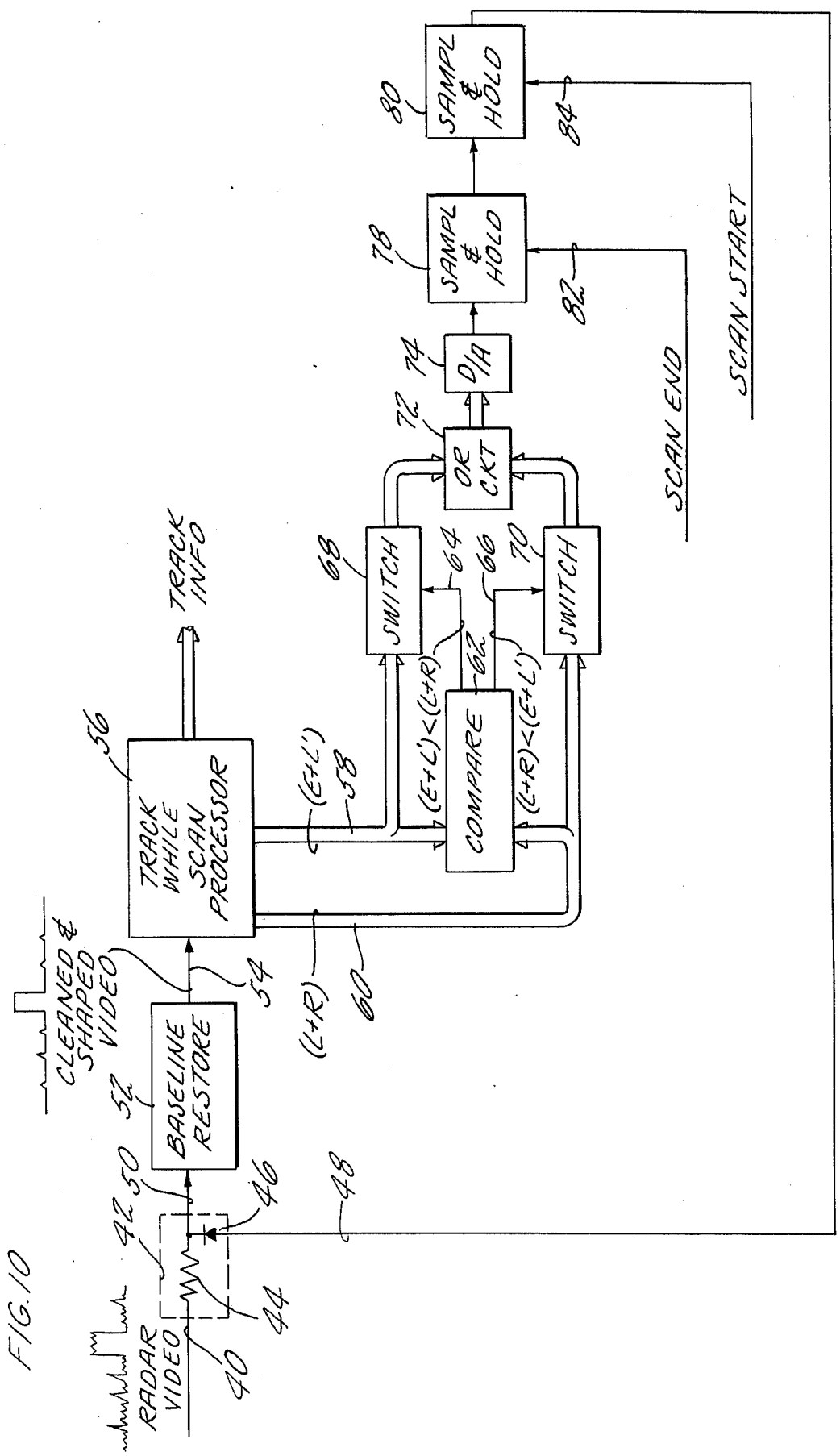

RADAR VIDEO CLIPPING LEVEL DERIVED FROM TARGET SIGNAL

BACKGROUND OF THE INVENTION

1. Field of Invention

This invention relates to radar, and more particularly to the derivation of a radar video noise/clutter clipping voltage level in an improved fashion.

2. Description of the Prior Art

A now well known innovation in search of scanning radars is the track-while-scan feature which allows pinpointing the instantaneous location of a target within a rather broad beamwidth, and to a range resolution which is within the ultimate range resolution of the radar, and then by means of "sliding window" computer processing, tracks the target while the scanning of an entire area continues. The tracking is updated once in each scan.

The radar antenna scans back and forth in azimuth, thereby sweeping a segment of the atmosphere in front of the radar, or the ground ahead of and below the radar, at a frequency of several Hz, while presenting strong signal returns on a plan position indicator (PPI) cathode ray tube radar scope. The radar transmits pulses of RF energy at a pulse repetition frequency which may be on the order of one or several KHz. As each pulse propagates outwardly, the energy is reflected off various target surfaces, and for surfaces which are suitably oriented with respect to the radar, return signals are received in the order in which the targets are contacted. Thus targets at a closer range appear sooner and targets at a further range appear later; by causing the sweep of the PPI scope to start at a zero range base for each pulse, the return signals will coincide with the position on the PPI scope which indicates its relative range. Since the antenna is scanning in azimuth, each pulse goes out in a different radial direction (a different azimuthal angle).

Because the beams of search radars are very broad, and because the pulsewidths are made large so as to transmit a large amount of energy for a maximum return signal (thereby to detect even weak targets such as small aircraft or motor vehicles) the target return signals indicate targets as being much larger than they are since return signals commence at a minimum range and extend through the length of the entire pulse thereby falsely indicating a still greater range, and return signals are received from the moment that the beam pattern first contacts the target, throughout several pulses while the beam pattern scans across the target, to the last pulse when any portion of the beam intersects the target. The track while scan radar narrows down the location of the target to one or two pulses in azimuth and to within one range gate resolution in range by determining a particular angle in azimuth and a particular range before and after which (in each case) one half of the energy (usually taken as a summation of voltages) is received by the antenna. All of this is known in the art, and is illustrated in more detail with respect to the drawing hereinafter. A track while scan radar of this type is disclosed, inter alia, in Frank U.S. Pat. No. 3,182,320, assigned to the U.S. Air Force.

To avoid the ambiguities which result from noise and clutter in track while scan radar systems known to the prior art, it is known to use a clipper to clip the noise and clutter out of the radar video prior to passage of the video to the track while scan processor so that very little noise (perhaps on the order of 10 percent) accompanies the target return signal. Since noise is substantially random in nature, it is possible to derive a reasonably good noise clipping voltage level simply by averaging the noise and target signals.

In the case of air-to-air radar systems, there is substantially no clutter in the atmosphere surrounding a solid target such as an aircraft. It is therefore very easy to discriminate the voltage summations which result from reflections off the target itself, and thereby the above process is readily implemented in a sufficiently accurate fashion. However, in use of a track while scan radar in an air to ground situation, the ground presents a substantial amount of clutter, which varies significantly within the azimuth/range window utilized for tracking, and which therefore significantly alters the right and left, and early and late voltage summations from the target itself. Since the clutter is far more significant in the return signal than is noise, and since the clutter is not random in nature, there is no real way to get an average value. In fact, it is impossible to ascertain the center of a target whenever the clutter in any one of the window segments is significantly different than the clutter in the opposite window segment.

In order to promote track while scan operation in air to ground radars, prior systems have used clipping of the radar video in attempts to sense only targets, while eliminating clutter and noise. However, to do so requires establishing a clipping level which will eliminate sufficient clutter and noise to allow the targets to stand out, while not reducing target signal strength below a useful level. One method known to the art for establishing a proper clipping level is to sample the clutter and noise in the area being searched by the radar and set the clipping level in accordance with the magnitude of the sample. In some cases, a noise and clutter level is sampled at the same range as the target but not at the target azimuth. In other cases, a noise and clutter level is sampled at maximum range. In either case, where the clutter varies significantly from the point at which it is sampled to the point at which the target is located, then either the clutter can be a significant portion of the summations and thereby render the target location inaccurate (in the case when the clutter and noise sample is very low compared to the clutter and noise surrounding the target), or may cause a clipping level which is so high as to prevent the target from passing through to the processor (in the case when the clutter is much higher in the sampling area than it is in the area surrounding the target) so the target appears to be as long in azimuth as its actual length plus nearly two beamwidths longer. Additionally, if there are multiple targets, a target with a good return signal may appear in one of the sample gates, thus establishing a very high clipping level so that the target being tracked is lost.

SUMMARY OF THE INVENTION

The object of the present invention is to provide improved noise/clutter discrimination in radar video.

According to the present invention, a radar video/noise clutter discrimination clipping level voltage reference is derived by the total level of signal of target returns, noise and clutter, within a target gate or window.

In accordance further with the invention, in a track while scan radar which pinpoints a target location by comparing target return voltage summations in the early half of a range gate with those in the late half of the range gate, and with the target return voltage summations in the left half of a multi-pulse azimuth gate with those in the right half of the azimuth gate, noise and clutter are clipped by means of a clipping signal level which is chosen from the lower value of the summation of the early and late target return voltage summations and the summation of the right and left target return voltage summations, thereby using the noise, clutter and target return signal within the target window in one scan to derive the clipping level for a succeeding scan.

The present invention provides a clipping level which is high for strong targets and low for weaker targets; the clipping level is thus geared to the strength of the target itself. The invention eliminates the difficulties of strong clutter in one area of scan affecting the clipping level in a tracking window in another area, and eliminates the possibility of strong target return signals in one area of scan affecting the clipping level of a tracking window in another area. The present invention eliminates the need for any feedback to maintain a clipping level which allows a certain percentage of noise to pass therethrough, and therefore is simpler than clipping level references in prior art track while scan radar systems. Because the clipping level is geared to the tracking window itself, the amount of noise which is passed to the processor is minimized for any given target amplitude. Heavy clutter/noise concentrations do not contribute to the establishment of the clipping action, except where necessary since the sampled noise/clutter appears within the tracking window itself. The invention may be utilized in single target tracking systems, or by multiplicity of apparatus or multiplexing, in multiple target tracking systems. The invention optimizes noise and clutter discrimination for each target, and since the target itself contributes to the clipping more than do the clutter and noise, the clipping level is less dependent on clutter and noise than in prior systems.

Although primarily adapted and well suited for use in track while scan radars, the present invention may be employed in conventional tracking radars to provide noise/clutter discrimination.

Other objects, features and advantages of the present invention will become more apparent in the light of the following detailed description of a preferred embodiment thereof, as illustrated in the accompanying drawing.

BRIEF DESCRIPTION OF THE DRAWING

FIGS. 1–3 are simplified illustrations of a radar antenna pattern intersecting a target;

FIG. 4 is a simplified illustration of increased target size as a result of beamwidth;

FIG. 5 is a simplified illustration of a PPI scope of a track while scan radar, showing successive pulses thereon in a range gate;

FIG. 6 is a simplified illustration of a track while scan PPI scope with a cursor positioned over a target;

FIG. 10 is a simplified schematic diagram of the improvement according to the present invention.

DESCRIPTION OF THE PREFERRED EMBODIMENT

Figure 7:
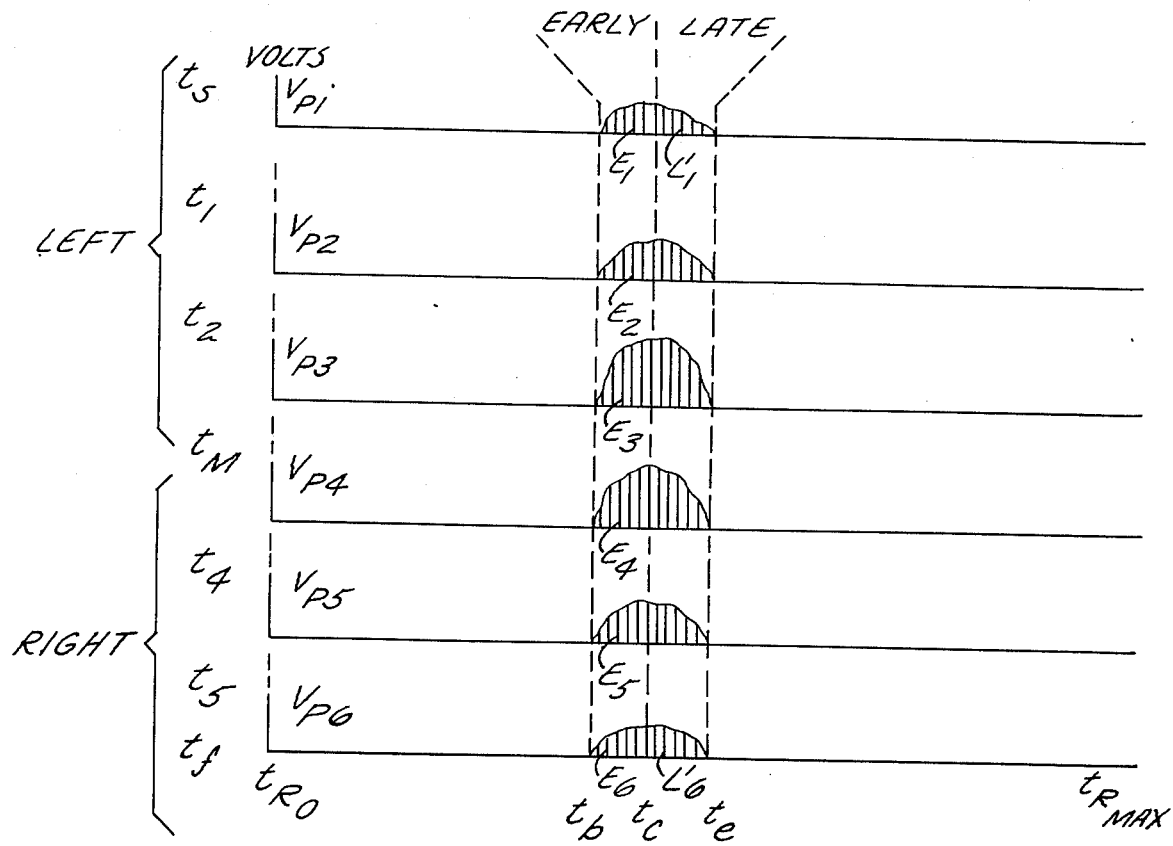
FIG. 7 is a diagram illustrating left and right and early and late target return voltage summations.

A simplified illustration of the well known nature of radar beams is presented in FIGS. 1–4. In FIG. 1, the radar beam pattern 20 is assumed to be scanning from left to right, and is seen to have just commenced impinging upon a target for which radar return signals can be received. As the antenna is caused to sweep an area being searched, within which a target is to be tracked, successive pulses from the antenna are beamed in successive azimuthal directions. Thus, several pulses later, the beam may entirely illuminate the target 22 as seen in FIG. 2. And even several pulses later (FIG. 3), when the angle in which the beam is directed has increased still further, the beam 20 still impinges on the target 22. The net result is the appearance of a target which is as wide, in azimuth, as the actual width of the target plus approximately one additional beamwidth as illustrated simplistically in FIG. 4. However, by comparing FIGS. 1 and 3 with FIG. 2, it is obvious the target return signal received at the radar will contain more energy when the beam is centered over the target (as in FIG. 2) than when the edge of the beam is just clipping the edge of the target (as in FIGS. 1 and 3). FIG. 5 is a simplified illustration of how successive pulses (P1–P6) appear at successive azimuthal positions. The sector 24 illustrates the range within which the target window is located, and the span between P1 and P6 illustrates roughly the azimuthal extent of the target window. The target is initially acquired by positioning cursors 26, 27 over the target 22 as is illustrated in FIG. 6. This may be achieved by utilizing independent cursors for range and azimuth which may be independently adjusted by respective manual controls 28, 30, or may be achieved by the light gun or joy stick apparatus disclosed in the aforementioned Frank patent. Similar, other methods of target acquisition may be utilized if desired.

Referring now to FIGS. 5 and 7, once a target is acquired, and the target window is established in both range and azimuth, the only signals responded to by the tracking processor are signals which appear within the target window as established by the range gate and the azimuth gate of the target window. Consider the pulse P1, which is the first transmitted pulse within the azimuth gate of the target window (FIG. 5). This pulse travels outwardly toward the target at the speed of light, and any target return signals resulting from the pulse impinging on the target is reflected back to the radar at the speed of light. As illustrated in FIG. 7, the pulse travels outwardly and return signals come back, with the time period between the starting time $t_S$ and a time separated therefrom by an amount dependent upon the pulse repetition frequency (PRF). Closer targets return signals to the radar sooner than farther targets. Thus within each time period ($t_S$ to $t_1$, $t_1$ to $t_2$, $t_2$ to $t_3$, etc.), the range of the target is a function of the time within which the return signal therefrom is received at the radar. These times are plotted horizontally from the time of zero range ($t_R$ ) through the time of maximum range ($t_R$ ). Thus for each pulse which is sent out there is a time $t_b$ where the pulse begins to impinge on the target, followed by a time $t_c$ where the pulse has reached the center of the target, followed by the time $t_e$ when the pulse reaches the end of the target. From the beginning time to the center time is herein defined as the Early gate (E) and from the center time to the end time is herein defined as the Late gate (L').

As described with respect to FIGS. 1-3 and FIG. 5 hereinbefore, for successive pulses, there will be a first pulse (P1) where the target is first impinged on by the radar beam (as in FIG. 1 hereinbefore), where only little energy is reflected from the target and the target return signal voltage is small. This voltage is illustrated as $V_{p1}$ in FIG. 7. The next pulse (P2) will impinge more fully on the target so that the related voltage return signal ($V_{p2}$) will be larger. And so forth, until the beam is pointed directly at the center of the target which may or may not occur exactly with one pulse, but which occurs somewhere near a middle time of azimuth scanning of the target. Thus on the left side of FIG. 7 are illustrated times between the start of the beam impinging on the target ($t_s$), to a time ($t_m$) when the beam is centered on the target to a time ($t_f$) where the beam is finished scanning the target. All of the pulses which are transmitted, and the corresponding return signals received, from the starting time to the middle time are herein defined as being within the Left gate (L), and all of the pulses which appear between the middle time and the finish time are herein defined as being within the Right gate (R).

The tracking error is determined by comparing voltage summations of Early and Late with those of Left and Right. Thus, in FIG. 7, one would sum VP1 in the Early period (E1) with VP2 in the Early period (E2), VP3 in the Early period (E3), VP4 in the Early period (E4), VP5 in the Early period (E5), and VP6 in the Early period (E6) so as to derive a target return voltage summation representative of signal strength in the early gate. Similarly, the average of the voltage VP1 across the Late gate (L'1) would be summed with other Late gate voltages of VP2 through VP5 through VP6 (L'6), so as to derive a target return signal voltage summation for the Late gate. The Left gate voltage summation is achieved by summing the entire (Early plus Late) return signal within the azimuth window for several pulses (VP1, VP2 and VP3) and the Right gate target return voltage summation is determined by summing the entire average voltages of VP4, VP5 and VP6.

The description thus far is descriptive of the operation of a track while scan radar of the type described by Frank. In the Frank patent, however, he refers to range as Rho and azimuth as Theta: thus the Early gate herein is referred to as the early Rho gate and the Late gate herein is referred to as the late Rho gate in the Frank patent. Similarly, the gate referred to herein as Left is referred to as the early Theta gate and the gate referred to herein as Right is referred to as the late Theta gate in the Frank patent.

Figure 8:
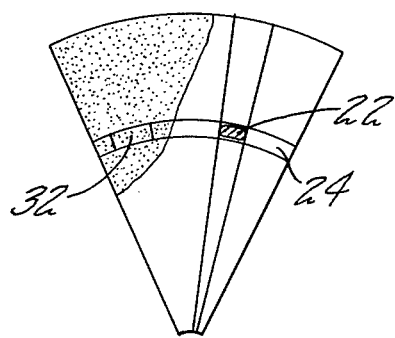
FIGS. 8 and 9 are simplified plan views of PPI scopes illustrating noise/clutter sample windows at other than the tracking window.

The particular problem to which the present invention relates is providing a suitable clipping level so that the radar video to which the track while scan processor responds is not so full of clutter as to render impossible the comparison of voltages in the Early and Late and Right and Left gates, as illustrated in FIG. 7. As described briefly with respect to the prior art hereinbefore, such clipping levels have been established, as illustrated in FIG. 8, by sampling the clutter return signals from an area 32 within the range gate 24 of the tracking window, but not at the same azimuth as the tracking window. The problem is, as can be seen in FIG. 8, that a high amount of clutter or other return in the area 32 where the sample is taken can provide too high a clipping level and swamp out the signal from the target 22. In the AN/APQ-148 radar, currently in use on the A6A Intruder jet aircraft, this approach is used. Although adequate in the air to air case, it has been found to be less than optimal in the air to ground case.

Figure 9:
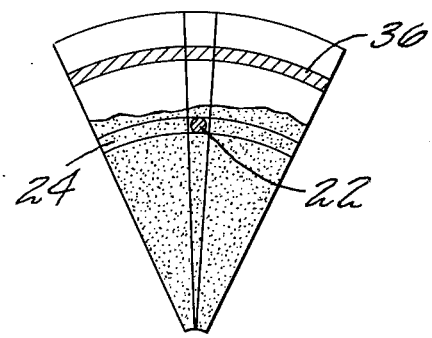

Typical air to air track while scan radars may utilize a sample, as illustrated in FIG. 9, taken from a full azimuth sweep area 36 which is at or near the maximum range of the radar. As seen in FIG. 9, however, if there is very little clutter at maximum range and high clutter in the area of the target 22, this will not provide a suitably high clipping level so as to swamp out the clutter in the vicinity of the target 22. Obviously, the situations in FIGS. 8 and 9 may be reversed; that is, too low a clutter sample from the region 32 will provide too low a clipping level in the arrangement of FIG. 8. Similarly, too high a clutter level in the area 36 will provide too high a clipping level in the arrangement of FIG. 9.

In typical track while scan radars of the more sophisticated type, such as the AN/APQ-148, the return signal voltage summation comparisons are usually normalized in order to accommodate the fact that the numerical values of (E-L') and (L-R) vary with target strength.

Referring now to one embodiment of the invention as illustrated in FIG. 10, the radar video is received on the line 40 and passed through a clipper 42 which may simply comprise a resistor 44 and a diode 46 which is connected to a line 48 that supplies a suitable voltage threshold level for the clipper. After clipping, the signal may be passed over a line 50 to a conventional base line restore circuit 52 which performs the function of supplying a zero DC level, and may simply comprise a normal clamp circuit. The output from the base line restore circuit 52 on a line 54 comprises the cleaned and shaped video (and is the same as the input to the video gate 34 in the aforementioned Frank patent). This is applied to the track while scan processor 56 which may comprise a digital processor (as in the AN/APQ-148 system) or an analog processor (as in the Frank patent). The embodiment shown in FIG. 10 is arranged for use with a digital processor. The processor provides signals representing the summation of target return voltage levels in the Early and Late gates (E + L') and the Left and Right gates (L + R) on respective trunks of digital lines 58, 60. These are applied to a compare circuit 62 to determine which summation is larger. The compare circuit will provide a signal on a line 64 when the Left and Right gates together provide a higher voltage summation than the Early and Late gates, and similarly provides a signal on a line 66 when the Early and Late gates together provide a higher voltage summation than the Left and Right gates. These signals activate related switches 68, 70 so as to pass the lesser summation value through an OR circuit 72 to a digital to analog converter 74. The lesser value of (E + L') or (L + R) is utilized to permit proper operation when the track action is better in one coordinate than in the other. In order to ensure that the clipping level isn't too large, and thereby reduce the actual target signal below a useful value, the lesser of the two summations is chosen to establish the clipping level. In the embodiment of FIG. 10, the OR circuit 72 may comprise a plurality of individual OR gates, one corresponding to each bit of the digital word in which the voltages are represented. The switches 68, 70 in the digital embodiment of FIG. 10 comprise individual AND gates, one for each bit of the digital word, all operated in response to the related one of the signal lines 64, 66. On the other hand, in an analog system such as that shown in the Frank patent, the signal lines 58, 60 will comprise individual voltage lines, and the switches 68, 70 will comprise simple voltage switches, such as suitably biased transistors, or diode quad switches. The OR circuit 72 in such a case will simply comprise voltage summation networks or a dot OR with suitable isolation diodes. In an analog embodiment, the digital to analog converter 74 is not required.

The voltage level provided by the digital/analog converter 74 is in response to the Early, Late, Left and Right gates during one scan. That is, as the radar beam is scanned from left to right in azimuth (see FIG. 5), only the summation of voltage levels which falls within the target window, $(E + L')$ and $(L + R)$, contribute to the voltage level established by the D/A converter. The voltage level established in one scan (a scan across the entire search area as seen in FIG. 5) is held for use as the clipping level for the succeeding scan. This may be achieved in several ways, such as providing a pair of sample and hold circuits 78, 80 so that the result reached in one scan can be stored during that scan in the sample and hold circuit 78, while, during the same scan, a previously achieved result is stored in the sample and hold circuit 80 for use during that scan. This may be achieved by gating the sample and hold circuit 78 in response to a signal on a line 82 which can be derived from the antenna or the plan position indicator scanning circuitry at the end of the scan, and similarly gating the sample and hold circuit 80 with a signal on a line 84 which can be derived from the antenna or PPI scanning control circuits at the start of each scan. Alternatively, registers may be used between the track while scan processor 56 and the compare circuit 62 and gates 68, 70 so as to store the $(L + R)$ and $(E + L')$ values from a preceding scan, to generate the signal level during a current scan; in such a case, the output of the digital to analog converter 74 may be applied directly to the line 48 for application to the diode 46. Or, the OR circuit could feed cascaded registers, and the D/A converter could convert the output of the second one.

In applying the present invention to the system shown in the aforementioned Frank patent, the radar video will be passed through the clipping circuit 42 (herein) before being applied as cleaned and shaped video to the video gate 34 (in Frank). The summation of $(L + R)$ and the summation of $(E + L')$ could simply be achieved by applying plus video to a summing circuit with both Early and Late gates. All of this is well within the skill of the art and is not described herein further.

In any embodiment, the clipping level voltage may be scaled to any desired proportion of the lesser of $(E + L')$ or $(L + R)$.

Thus, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the U.S. is:

1. In a scanning pulse radar system having processing means providing signals representing the summation of early and late target return signal voltages and the summation of right and left target return signal voltages in response to target return signal voltage levels in a multi-phase target window, and having a radar video clipper responsive to a reference voltage for cleaning and shaping radar video prior to application to the processing means, the improvement comprising:
   means for developing a clipping level voltage proportional to at least one of the signals included in the group of the left and right summation signals and the early and late summation signals in one scan; and
   means for applying said clipping level voltage in a next succeeding scan as the reference voltage to the radar video clipper.

2. In a scanning pulse radar system having processing means providing signals representing the summation of early and late target return signal voltages and the summation of right and left target return signal voltages in response to target return signal voltage levels in a multi-pulse target window, and having a radar video clipper responsive to a reference voltage for cleaning and shaping radar video prior to application to the processing means, the improvement comprising:
   means for selecting from among the left and right summation signals and the early and late summation signals provided in one scan, to develop a clipping level voltage proportional to the signals selected from among the left and right summation signals and the early and late summation signals; and
   means for applying said clipping level voltage in a next succeeding scan as the reference voltage to the radar video clipper.

3. In a scanning, pulse radar system having processing means providing signals representing the summation of early and late target return signal voltages and the summation of right and left target return signal voltages in response to target return signal voltage levels in a multi-pulse target window, and having a radar video clipper responsive to a reference voltage for cleaning and shaping radar video prior to application to the processing means, the improvement comprising:
   first means for comparing the magnitude of left and right summation signals with the early and late summation signals provided in one scan, and developing a clipping level voltage proportional to the lesser of the left and right summation signals and the early and late summation signals; and
   second means connected for response to said first means for applying said clipping level voltage in a next succeeding scan as the reference voltage to the radar video clipper.

4. The improvement according to claim 3 wherein said first means comprises:
   a compare circuit which generates at respective outputs an $(E+L')<(L+R)$ signal in response to the magnitude of the left and right summation signals being greater than the magnitude of the early and late summation signals and an $(L+R)<(E+L')$ signal in response to the magnitude of the early and late summation signals being greater than the magnitude of the left and right summation signals;
   a pair of switch means connected to respective outputs of said compare circuit, one responsive to the left and right summation signals and operative to pass the left and right summation signals in response to said $(L+R)<(E+L')$ signal, and the other responsive to the early and late summation signals and operative to pass the early and late summation signals in response to said $(E+L') < (L+R)$ signal; and third means responsive to both of said gates for developing said clipping level voltage.

5. The improvement according to claim 4 wherein said third means comprises:

an OR circuit responsive to both of said gates and operative to pass therethrough signals passed by either of said gates; and means for sampling the output of said OR circuit in one scan and holding said output for utilization in a subsequent scan.

* * * * *

UNITED STATES PATENT OFFICE
CERTIFICATE OF CORRECTION

PATENT NO. : 3,983,556
DATED : September 28, 1976
INVENTOR(S) : Paul M. Danzer and Giles E. Rae It is certified that error appears in the above-identified patent and that said Letters Patent are hereby corrected as shown below:

Column 4, line 60, "$(t_R)$" should read --$(t_{R_0})$

Column 4, line 61, "$(t_R)$" should read --$(t_{R_{max}})$

Column 7, line 68, "multi-phase" should read --multi-pulse--

Signed and Sealed this

Thirtieth Day of November 1976

[SEAL]

Attest:

RUTH C. MASON
Attesting Officer

C. MARSHALL DANN
Commissioner of Patents and Trademarks